United States Patent [19]
Iwabuchi

[11] Patent Number: 6,108,173
[45] Date of Patent: Aug. 22, 2000

[54] MAGNETIC LOCKING MECHANISM FOR A DISK DRIVE ACTUATOR

[75] Inventor: Masanori Iwabuchi, Ibaragi, Japan

[73] Assignee: NEC Corporation, Tokyo, Japan

[21] Appl. No.: 08/311,710

[22] Filed: Sep. 23, 1994

Related U.S. Application Data

[63] Continuation of application No. 07/941,686, Sep. 8, 1992, abandoned.

[30] Foreign Application Priority Data

Sep. 6, 1991 [JP] Japan ................................. 3-227486

[51] Int. Cl.⁷ ...................................................... G11B 5/54
[52] U.S. Cl. .............................................................. 360/256.2
[58] Field of Search ................................. 360/105, 106, 360/256.2

[56] References Cited

U.S. PATENT DOCUMENTS

| | | | |
|---|---|---|---|
| 4,999,530 | 3/1991 | Azuma et al. ........................... | 360/105 |
| 5,003,422 | 3/1991 | Sun et al. ................................ | 360/105 |
| 5,023,736 | 6/1991 | Kelsic et al. ............................ | 360/105 |
| 5,034,837 | 7/1991 | Schmitz .................................. | 360/105 |
| 5,170,300 | 12/1992 | Stefansky .............................. | 360/105 |
| 5,208,713 | 5/1993 | Lindsay et al. ......................... | 360/105 |
| 5,224,000 | 6/1993 | Casey et al. ............................ | 360/105 |
| 5,262,913 | 11/1993 | Stram et al. ........................... | 360/105 |

*Primary Examiner*—David Davis
*Attorney, Agent, or Firm*—Sughrue, Mion, Zinn, Macpeak & Seas, PLLC

[57] ABSTRACT

A mechanism for fixing a magnetic head of a magnetic disk drive in place over the parking area of a recording medium when the disk drive is not in operation. The head records or reproduces data in or out of the data storage area of the medium. When the disk drive is not operated, a magnet and a magnetic piece cooperate to retain the head above the parking area of the medium. A yoke adjoins the side of the magnet for absorbing magnetic lines of force issuing from the magnet, so that the magnetic lines of force may not act on the magnetic piece when the head records or reproduces data.

8 Claims, 6 Drawing Sheets

MAGNETIC LOCKING MECHANISM FOR A DISK DRIVE ACTUATOR

This is a Continuation of application Ser. No. 07/941,686 filed Sep. 8, 1992 now abandoned.

BACKGROUND OF THE INVENTION

The present invention generally relates to a magnetic disk drive capable of recording and reproducing data out of a magnetic disk or similar medium by moving a magnetic head mounted on an actuator arm over the medium and, more particularly, to a mechanism for fixing the head in place when the disk drive is not operated.

A hard disk drive or similar magnetic disk drive is extensively used to record and reproduce data out of a magnetic disk or similar medium. It is a common practice with this kind of disk drive to position and fix a magnetic head thereof above the parking area of a medium when the disk drive is not in operation, thereby protecting the data recording surface of the medium. The head has to be fixed in such a position while the power supply is in an OFF state, and various implementations have heretofore been proposed for such a purpose. Among them, the implementation using a magnet, i.e., fixing the head by the magnetic force of a magnet is simple in construction.

Specifically, the magnetic force acts between part of a movable portion movable integrally with an actuator arm on which the head is mounted and a position which part of the movable portion faces when the head lies over the parking area of the medium. As a result, the movable portion and, therefore, the head are fixed in place.

However, the conventional magnet scheme described above has the following problem. Since the parking area and the data storage area of the medium adjoin each other, the position to which the movable portion should be moved during recording or reproduction and the position where it should be fixed by the magnet adjoin each other. Therefore, the magnet tends to urge the movable portion toward the fixing position even during recording or reproduction. This is especially true when a magnet exerting a strong force is used to firmly fix the head in place. Such a force of the magnet prevents the head from being accurately positioned.

SUMMARY OF THE INVENTION

It is therefore an object of the present invention to provide a head fixing mechanism for a magnetic disk drive capable of surely fixing a head in place when the disk drive is not operated.

It is another object of the present invention to provide a head fixing mechanism for a magnetic disk drive which does not adversely effect the positioning characteristic of a head during recording or reproduction.

It is another object of the present invention to provide a simple head fixing mechanism for a magnetic disk drive.

In accordance with the present invention, a mechanism incorporated in a magnetic disk drive, which records or reproduces data in or out of a medium by moving a magnetic head affixed to an arm member over the medium, for fixing the magnetic head over a parking area of the medium when the magnetic disk drive is not in operation comprises a movable portion constructed integrally with the arm member and movable over a predetermined range as the magnetic head moves, a first magnetic member mounted on the movable portion, and a second magnetic member located in a position where the first magnetic member stands closest to the second magnetic member and faces it when the movable portion is brought to one end of the predetermined movable range, wherein magnetic lines of force issue from at least one of the first and second magnetic members to the other magnetic, and an absorbing member for absorbing the magnetic lines of force.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
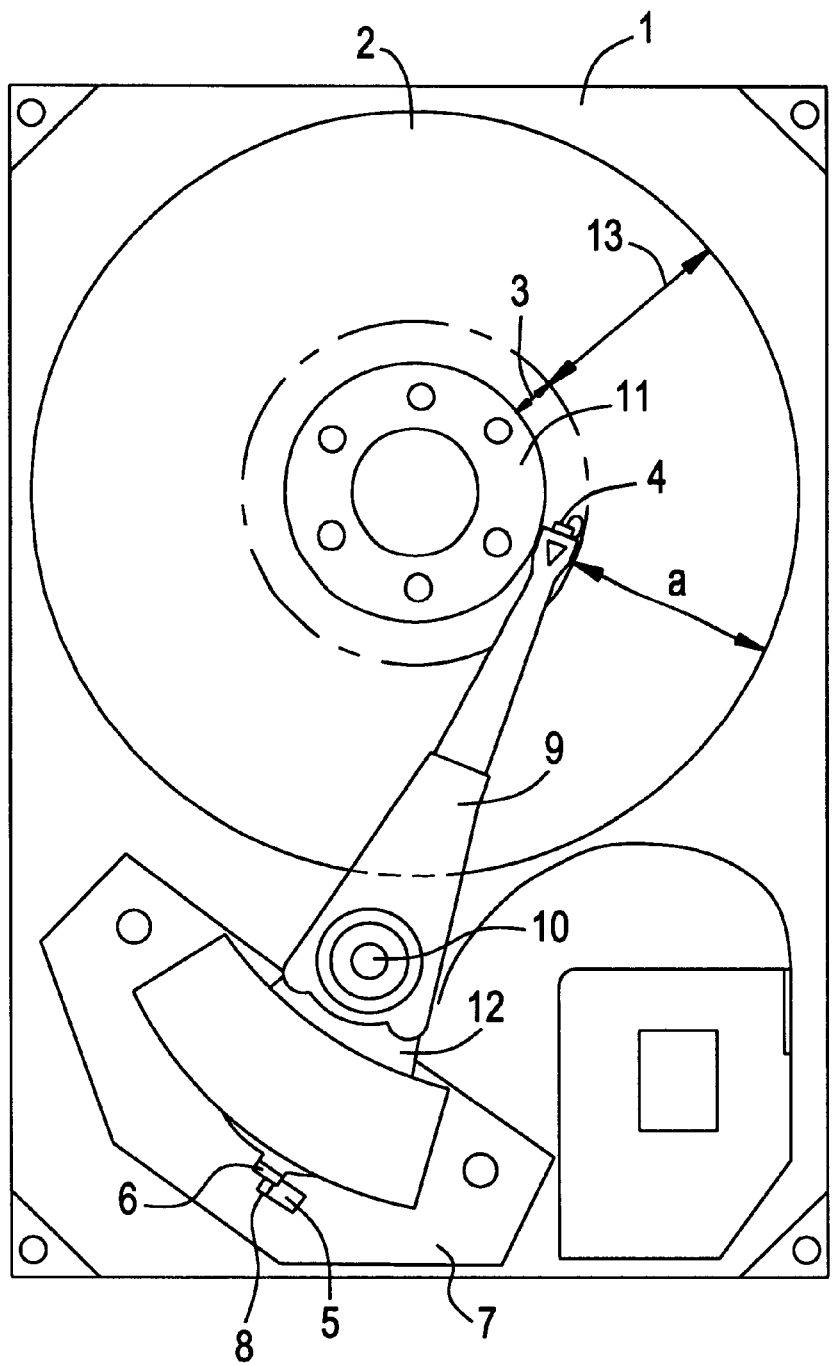
FIG. 1 is a plan view of a magnetic disk drive to which a preferred embodiment of the head fixing mechanism in accordance with the present invention is applied.

Referring to FIG. 1 of the drawings, a magnetic disk drive to which a head fixing mechanism embodying the present invention is applied is shown. As shown, the magnetic disk drive has a base 1, a spindle 11 rotatably supported by the base 1, and a magnetic disk or similar recording medium 2 affixed to the spindle 11. The spindle 11 is rotated by a spindle motor, not shown, to in turn cause the medium 2 to spin. A voice coil motor (VCM) 7 and a shaft 10 are also mounted on the base 1. An actuator arm 9 is supported by and pivotable about the shaft 10. A magnetic head 4 is mounted on one end of the actuator arm 9 for recording or reproducing data in or out of the medium 2. The VCM 7 has a movable portion 12 which is affixed to the other end of the actuator arm 9 remote from the head 4. In this configuration, the VCM 7 drives the head 4 in a direction indicated by an arrow α via the actuator arm 9. The surface of the medium 2 is divided into a data storage area 13 and a parking area 3. When the disk drive is not driven, the head 4 remains positioned over the parking area 3.

A magnetic piece 6 protrudes from part of the movable portion 12 of the VCM 7 which is remotest from the shaft 10. A permanent magnet or similar magnet 5 is affixed to part of the stationary side of the VCM 7. Although the magnetic piece 6 is movable about the shaft 10 together with the movable portion 12, it does not contact the magnet 5. Specifically, the arcuate locus of the piece 6 and the magnet 5 are slightly spaced apart from each other in a direction perpendicular to the sheet surface of FIG. 1. The magnet 5 is positioned such that it stands closest to the piece 6 when the head 4 is located at the parking area 3. A generally H-shaped yoke 8 is affixed to the left end of the magnet 5 with respect to the locus of the piece 6, i.e., the end which the piece 6 passes during the movement of the head 4 from the data storage area 13 to the parking area 3.

Figure 2A:
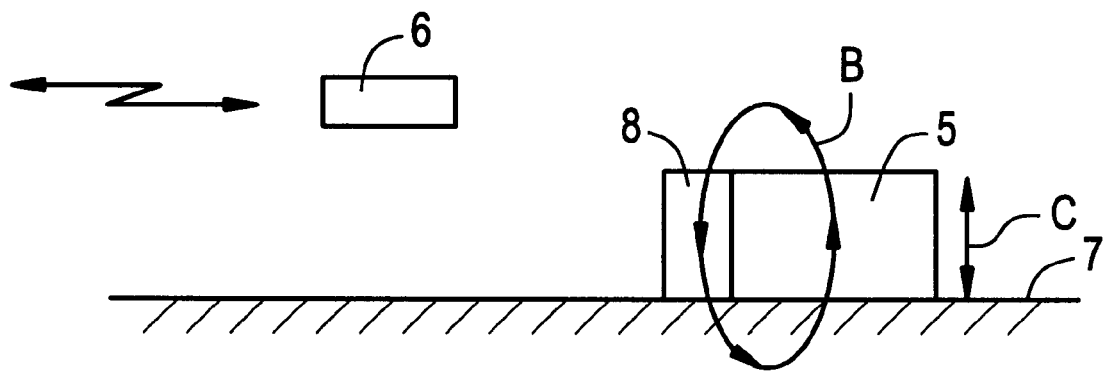
FIGS. 2A and 2B are side elevations as viewed in a direction A of FIG. 1, each showing a relation between a magnet and a magnetic piece included in the embodiment in a particular condition.
Figure 2B:
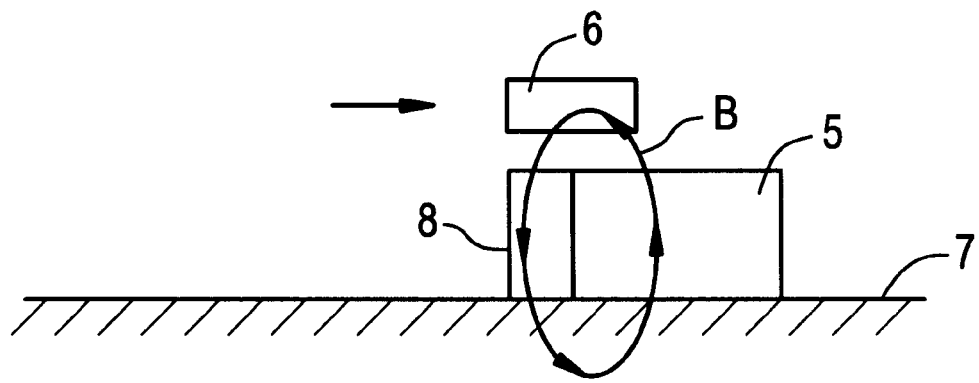

FIGS. 2A and 2B show a relation between the magnetic piece 6 and the magnet 5 constituting essential part of the embodiment, as viewed in a direction indicated by an arrow A in FIG. 1. Specifically, while the head 4 is disposed in the data storage area 13 of the medium 2 for reading or writing data, the magnet 5 and yoke 8 and the piece 6 are held in the relation shown in FIG. 2A. In this condition, the magnet 5 and yoke 8 and the piece 6 are spaced apart some distance in the right-and-left direction as viewed in the figure. Assume that the head 4 is brought to the radially innermost position of the data storage area 13, locating the right end of the piece 6 above the yoke 8. Even in such a condition, the flux being generated by the magnet 5 does not effect the piece 6 since part of the flux issuing toward the piece 6, i.e., to the left is absorbed by the yoke 8 and caused to flow in a direction B. In FIG. 2A, the direction of magnetization of the magnet 5 is labeled C. FIG. 2B shows a relation between the magnet 5 and yoke 8 and the piece 6 occurring when the head 4 is located over the parking area 3. As shown, a magnetic circuit is set up through the magnet 5, piece 6 and yoke 8. As a result, the magnet 5 strongly attracts the piece 6 to thereby maintain the head 4 over the parking area 3 stably.

Figure 3A:
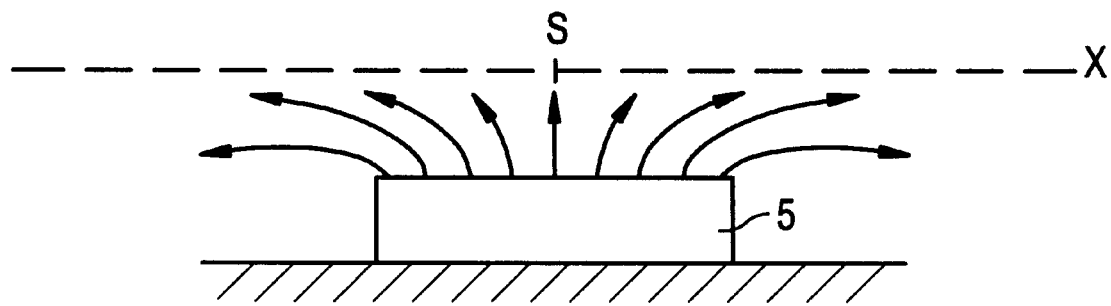
FIGS. 3A and 3B each show magnetic lines of force issuing from a magnet.
Figure 3B:
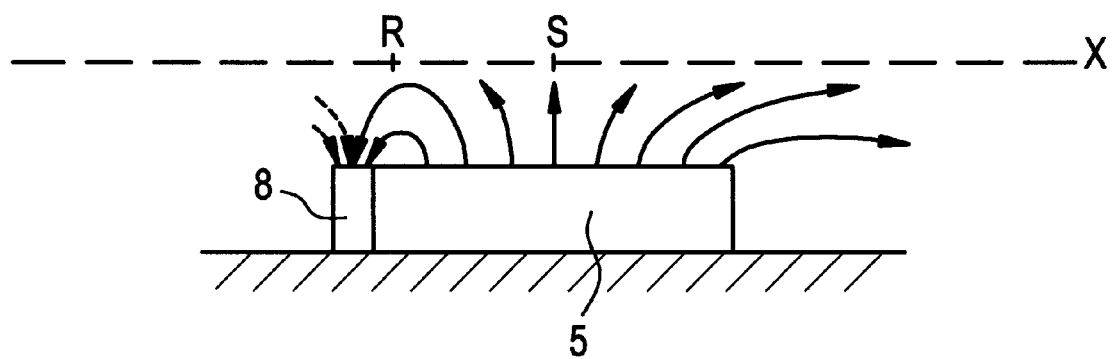
Figure 4A:
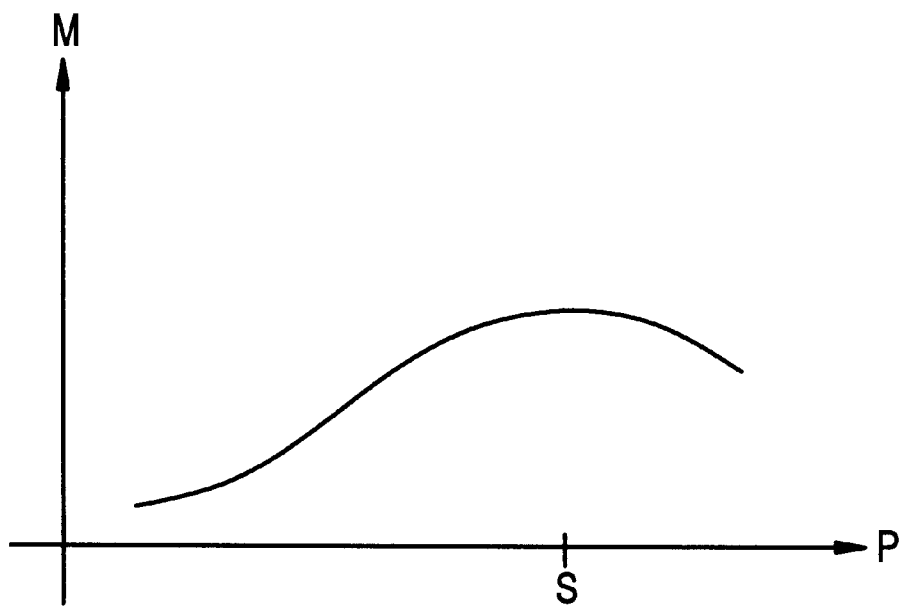
FIGS. 4A and 4B are graphs respectively associated with FIGS. 3A and 3B, each showing a flux density distribution on a line X.
Figure 4B:
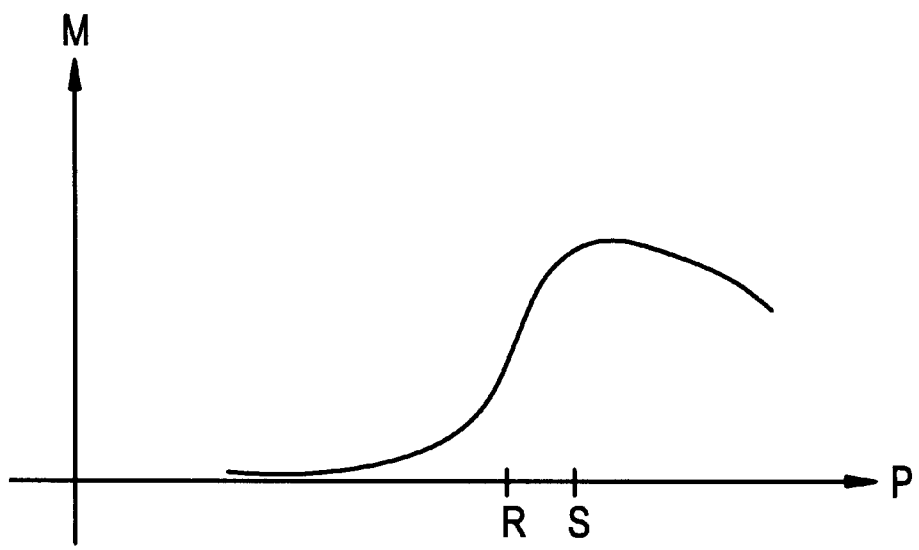
Figure 5:
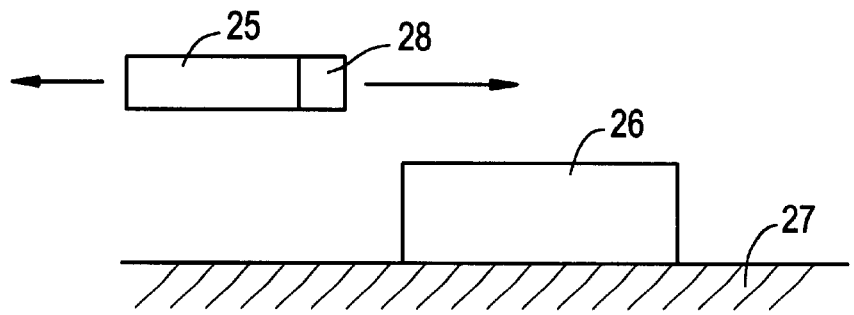
FIGS. 5–9 are side elevations each showing an alternative embodiment of the present invention.

The function of the yoke 8 will be described specifically. FIGS. 3A and 3B show respectively magnetic lines of force particular to the case without the yoke 8 and magnetic lines of force particular to the case with the yoke 8. In FIG. 3A, magnetic lines of force issue symmetrically in the right-and-left direction with respect to the center S of the magnet 5. In FIG. 3B, magnetic lines of force located at the left of the center S are absorbed by the yoke 8, so that the magnetic lines of force generated by the magnet 5 scarcely extend to the left of the yoke 8. FIGS. 4A and 4B are graphs corresponding to FIGS. 3A and 3B, respectively, and each shows a flux density distribution M measured at positions P on a line X (representative of the locus of the magnetic piece 6). In FIG. 4A, the flux density M is highest at the position P facing the center S of the magnet 5 and slowly decreases symmetrically in the right-and-left direction. By contrast, in FIG. 4B, the flux density M is highest at the center S of the magnet 5 and slowly decreases at the right-hand side of the center S, but it sharply decreases at the left-hand side due to the yoke 8 and to a far lower level than the curve of FIG. 4A.

In FIGS. 3B and 4B, a point labeled R is representative of a position where the gradient of the curve representative of the flux density distribution is greatest, i.e., where the flux density M changes most sharply. When the magnetic piece 6 is located at the point R, it is subjected to the most intense attraction, i.e., the greatest retaining torque. Therefore, in the illustrative embodiment having the yoke 8, the magnetic piece 6 moving along the line X from the left is hardly effected by the magnet 5 before it reaches a position just before the point R, intensely attracted on reaching such a position, and then retained by a great force on reaching the point S. Even if an unexpected force acts on the arm 9 and movable portion 12 to move the piece 6 from the point S toward the point R, the piece 6 is returned to the point S due to the intense attraction acting at the point R.

Figure 6:
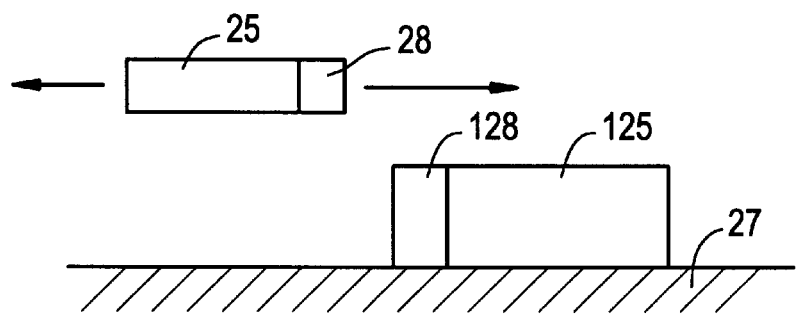
Figure 7:
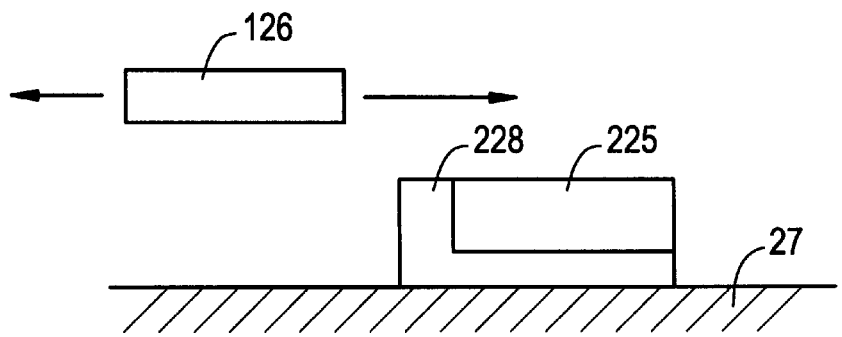
Figure 8:
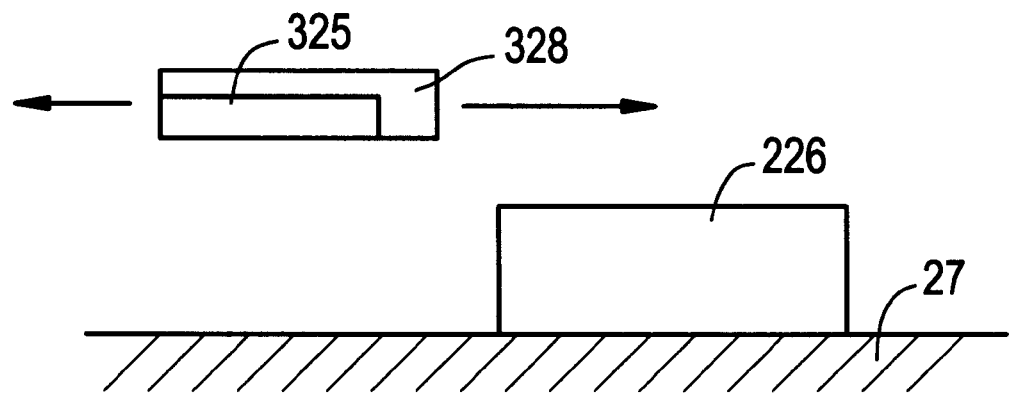
Figure 9:
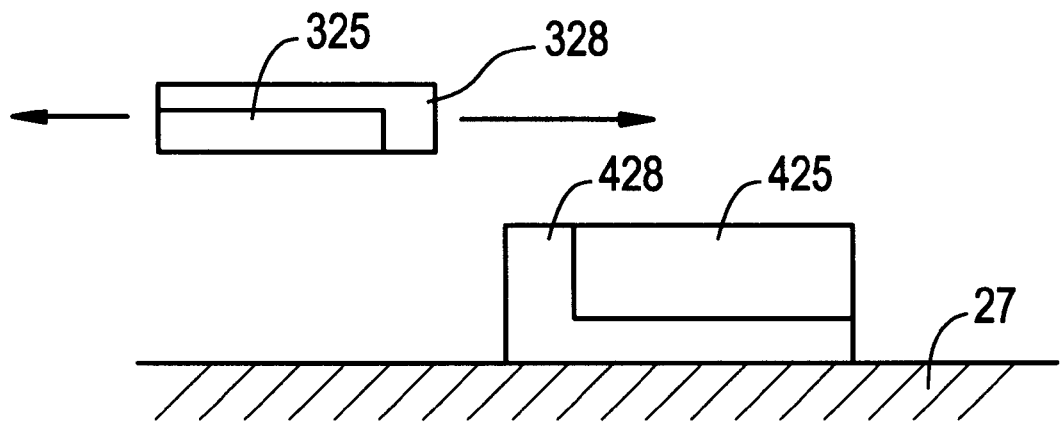

Alternative embodiments of the present invention will be described with reference to FIGS. 5–9 corresponding to FIGS. 2A and 2B. In the embodiment shown in FIG. 5, a magnetic piece 26 is affixed to the VCM 27 while a magnet 25 and a yoke 28 are mounted on the movable portion. In the embodiment of FIG. 6, a magnet and a yoke are mounted on both of the VCM 27 and movable portion, i.e., a magnet 25 and a yoke 28 on the movable portion and a magnet 125 and a yoke 128 on the VCM 27. Such a configuration is successful in providing an especially strong fixing force. FIG. 7 shows an embodiment wherein a yoke 228 has a generally L-shaped section and resembles the yoke shown in FIGS. 2A and 2B except that it extends to below the magnet 225. The yoke 228 is mounted on the VCM 7 to act on a magnetic piece 126 mounted on the movable portion. As shown in FIG. 8, a yoke 328 and a magnet 325 may be mounted on the movable portion while a magnetic piece 226 may be mounted on the VCM 27, if desired. FIG. 9 shows an arrangement wherein both the VCM 27 and the movable portion are provided with the L-shaped yoke and magnet, i.e., a yoke 428 and a magnet 425 and a yoke 328 and a magnet 325, respectively.

As stated above, the illustrative embodiments each sets up an offset flux density distribution in the direction of travel of the movable portion. For this purpose, the magnetic yoke is mounted on the side of the magnet which faces the above-mentioned direction. The yoke may be closely fitted on the magnet or may be slightly spaced apart from it in order to further enhance the absorption of the magnetic lines of force.

In summary, it will be seen that the present invention provides a head fixing mechanism for a magnetic disk drive in which magnetic lines of force generated by a magnet are partly absorbed. Specifically, the mechanism of the invention exerts a sufficient magnetic force when a head lies over the parking area of a medium and sharply reduces the magnetic force, i.e., magnetic lines of force when the head lies over the data storage area of the medium. This allows the head to be surely retained over the parking area while the disk drive is not operated.

Various modifications will become possible for those skilled in the art after receiving the teachings of the present disclosure without departing from the scope thereof.

What is claimed is:

1. A structure for fixing a magnetic head which records or reproduces data in or out of a medium having a recording area and a parking area, said structure comprising:

a base on which the medium is mounted;

an arm holding the magnetic head over the medium;

movable means for moving said arm;

a member mounted on said arm;

a magnetic body mounted on said member and movable through a planar locus of points as said arm moves;

a magnet fixed to said base for attracting said magnetic body and spaced apart from said magnetic body in a direction perpendicular to a plane containing said planar locus of points, said magnetic body standing closest to said magnet when the magnetic head is positioned over the parking area of the medium, said magnet being magnetized perpendicularly to said plane containing said planar locus of points; and a yoke mounted on said magnet for absorbing magnetic lines of force issuing from said magnet.

2. A structure as claimed in claim 1, wherein said yoke is mounted on a side of said magnet closest to said magnetic body when said magnetic body moves toward said magnet.

3. A structure as claimed in claim 1, wherein said yoke has a generally L-shaped configuration and partly adjoins said side of said magnet.

4. A structure for fixing a magnetic head which records or reproduces data in or out of a medium having a recording area and a parking area, said structure comprising:

a base;

an arm holding the magnetic head over the medium;

movable means for moving said arm;

a member mounted on said arm;

a magnet mounted on said member and movable through a planar locus of points as said arm moves, said magnet being magnetized in a direction perpendicular to a plane containing said planar locus of points of said magnet;

a magnetic body fixed to said base and attracted by said magnet, said magnetic body being spaced apart from the planar locus of points through which said magnet moves in a direction perpendicular to said plane containing said planar locus of points, said magnetic body standing closest to said magnet when the magnetic head is positioned over the parking area of the medium; and a yoke mounted on said magnet for absorbing magnetic lines of force issuing from said magnet.

5. A structure as claimed in claim 4, wherein said yoke is mounted on a side of said magnet closest to said magnetic body when said magnet moves toward said magnetic body.

6. A structure as claimed in claim 4, wherein said yoke has a generally L-shaped configuration and partly adjoins said side of said magnet.

7. A structure for fixing a magnetic head which records or reproduces data in or out of a medium having a recording area and a parking area, said structure comprising:

a base;

an arm holding the magnetic head over the medium;

movable means for moving said arm;

a member mounted on said arm;

a first magnet mounted on said member and movable through a planar locus of points as said arm moves, said first magnet being magnetized in a direction perpendicular to a plane containing said planar locus of points of said first magnet;

a second magnet fixed to said base for attracting said first magnet and spaced apart from the planar locus of points through which said first magnet moves in a direction perpendicular to said plane containing said planar locus of points, said first magnet standing closest to said second magnet when the magnetic head is positioned over the parking area of the medium, said second magnet being magnetized in a direction perpendicular to the plane containing said planar locus of points through which said first magnet moves;

a first yoke mounted on said first magnet for absorbing magnetic lines of force issuing from said second magnet; and a second yoke mounted on said second magnet for absorbing magnetic lines of force issuing from said second magnet.

8. A structure as claimed in claim 7, wherein at least part of said first yoke is mounted on a side of said first magnet closest to said second magnet when said first magnet moves toward said second magnet, at least part of said second yoke being mounted on a side of said second magnet closest to said first magnet when said first magnet moves toward said second magnet.

* * * * *